Mar. 3. 1925.

Re. 16,017

E. T. SHAW ET AL

WINDSHIELD WIPER

Original Filed April 13, 1922

Inventors
Edward T. Shaw
Charles H. Petronin
by
J. W. Fraser
Attorney

Reissued Mar. 3, 1925.

Re. 16,017

UNITED STATES PATENT OFFICE.

EDWARD T. SHAW AND CHARLES H. PETRONIN, OF PITTSFIELD, MASSACHUSETTS, ASSIGNORS, BY MESNE ASSIGNMENTS, TO GEORGE H. SOUTHARD, JR., RECEIVER OF BERKSHIRE PRODUCTS CORPORATION, OF PITTSFIELD, MASSACHUSETTS, A CORPORATION OF MASSACHUSETTS.

WINDSHIELD WIPER.

Original No. 1,445,853, dated February 20, 1923, Serial No. 552,191, filed April 13, 1922. Application for reissue filed November 6, 1924. Serial No. 748,291.

*To all whom it may concern:*

Be it known that we, EDWARD T. SHAW and CHARLES H. PETRONIN, both citizens of the United States, and both residing at Pittsfield, Berkshire County, Massachusetts, have invented certain new and useful Improvements in Windshield Wipers, and do declare that the following is a full, clear, and exact description of the invention, such as will enable others skilled in the art to which it appertains to make and use the same.

This invention relates to devices for wiping the windshield of an automobile, but more particularly refers to certain unitary means whereby the wiper shaft may be manually operated at any desired time without the employment of any separate device for disconnecting the power driven instrumentalities by which such shaft is ordinarily operated.

In a windshield wiper such as the present invention is identified with, the wiper shaft is rocked in reverse directions by the to and fro sliding movements of a rack which meshes with a pinion carried by such shaft, and this rack is operated by certain means actuated from an electric motor. The present invention, however, has nothing whatever to do with the means for automatically operating the wiper shaft, but merely relates to certain constructions whereby the wiper shaft may be simultaneously disconnected from its driving member and operated manually.

It frequently happens that a windshield has adhering thereto ice particles or mud, and that the power supplied from the electric motor is not sufficient to operate the wiper against these obstructions. In such instance it is highly desirable that the wiper may be operated manually so as to remove these obstructions so that thereafter there will be no difficulty in the functioning of the wiper when driven by the electric motor.

The chief object is to utilize such means for carrying out this invention that a minimum resistance will be offered to the free operation of the wiper by the motor.

In the accompanying drawing—

Figure 1:
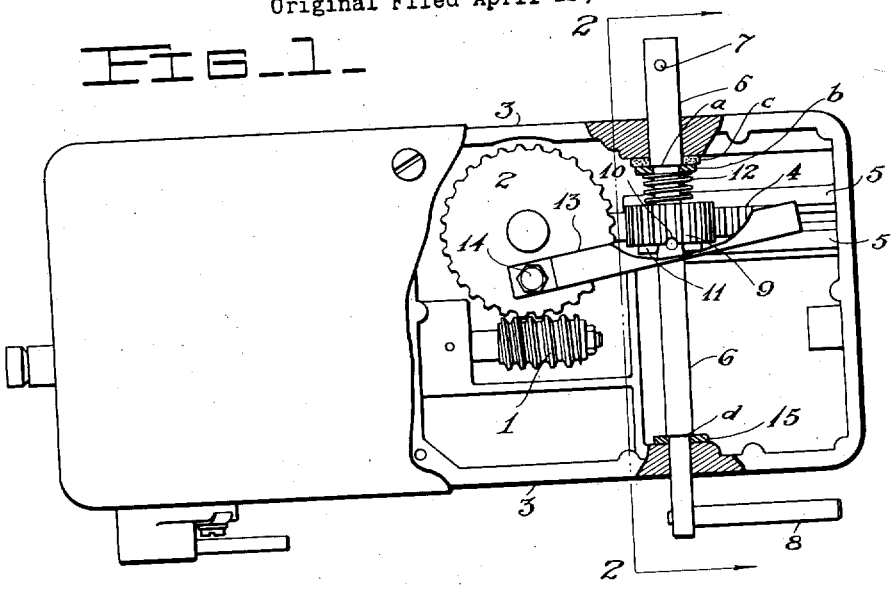
Figure 1 is a plan view of the casing partly in section with the cover removed showing the operative parts of the wiper.
Figure 2:
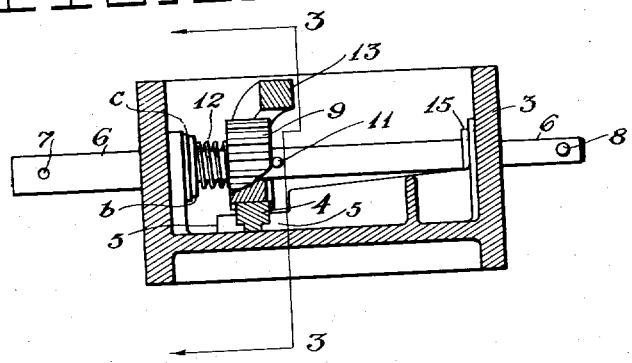
Figure 2 is a sectional elevation at the line 2—2 of Figure 1.
Figure 3:
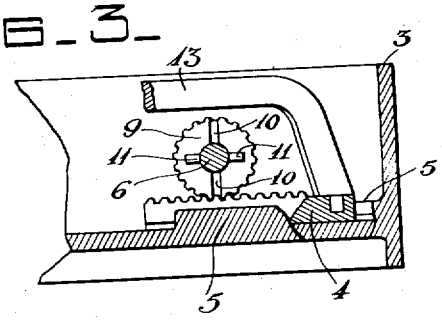

Figure 3 a section at the line 3—3 of Figure 1.

Similar numerals of reference denote like parts in the several figures of the drawing.

No particular attention herein will be paid to the detailed description of the automatic means for operating the wiper shaft from the electric motor, but a brief description will now be given of the manner in which the wiper is operated so that the present invention will be more readily understood.

On the end of the electric motor shaft is a worm 1 which meshes with the worm wheel 2 suitably journaled in the casing 3. 4 is a rack guided between suitable ways 5 and supported on the bottom of the casing. 6 is the wiper shaft journaled in the casing and extending from the sides thereof one end of the shaft being provided with the usual perforations 7 within which the wiper arm is secured while the other extremity has secured thereto a crank 8.

One extremity of the shaft 6 is enlarged at the location where it is journaled in the casing and this enlargement extends beyond the inner wall of the journal bearing so as to form a shoulder *a*, and around the shaft on its smaller diameter and abutting this shoulder is a thin steel washer *b*, and confined between this washer and the wall of the bearing and loose around the shaft at its larger diameter is a felt disk *c* to prevent leakage of oil.

Loosely mounted on this shaft 6 at its smaller diameter is a driving member or pinion 9 which has in one side face a shallow recess 10 and from the shaft 6 extends a pin 11 which normally is housed within this recess so that it will be clearly understood that the driving member or pinion is locked on the shaft 6 by the engagement of this pin 11 within this recess 10, and on the other side of the member 9 is a coil spring 12 around the shaft 6 and bearing against the washer *b* and the face of said member, the function of this spring being to always insure the ready engagement of the pin 11 within the recess 10.

It will be noted that, since the washer *b* abuts the shoulder portion *a* of the shaft, this shoulder serves as a thrust collar, so that there will be no pressure from the spring against the inner wall of the journal bearing such as might exert a disadvantageous braking effect against the ready functioning of the motor.

The end of the shaft which carries the crank 8 is shouldered at *d* inside the casing and the collar 15 surrounds the shaft 6 and is confined between this shoulder and the casing, the function of which collar is to act as a thrust shoulder. While it is preferred to retain the collar in this connection, nevertheless it may be omitted, since the shoulder *d* may be so located that it will perform the same function as the collar.

13 is a pitman one end of which is swivelled around an eccentric pin 14 extending from the face of the wheel 2, while the other end has a swivelled seat within the rack 4.

From the foregoing description it will be clear that as the worm 1 revolves it will effect the revolution of the wheel 2 which will cause reciprocatory movements of the rack 4, and this rack being always in mesh with the pinion 9, the wiper shaft 6 will be rocked in reverse directions.

By turning the crank 8 on the end of the shaft 6 the pin 11 will ride up the wall of the recess 10 in the driving member and will thereby force said member backward against the resiliency of the spring 12 and thus bring the pin flat against the face of the member. By swinging the crank 8 in reverse directions the wiper shaft can thus be manually operated for any suitable time or purpose, and meanwhile the driving member may be driven idly around the shaft 6 by the power operating instrumentalities. The driving member is locked on the shaft 6 at any time by the continued rotation of the power driven means.

As the member 9 is thus forced backward, the thrust of the spring will be confined between the shoulder of the shaft and the pin through the shaft, and any end play of the shaft will be restricted by the shoulder *a* and the collar 15, and in this connection attention is called to the fact that, during hand manipulation of the shaft, friction caused by end thrusts of the shaft need not, of course, be considered. But, when the wiper is operated from the motor, the spring causes no thrust load whatever, while the thrust of the spring is fully exerted against the shaft itself, so that it will be clear that there can be no drag on the motor due to this construction.

The very act of manually operating the wiper shaft disengages the clutch elements that are carried by the shaft and by the driving member that is loose on said shaft, so that it will be clear that no special means is employed to disconnect the power driven instrumentalities, and that the mere release of the manual operating crank or other device, causes the re-engagement of said clutch elements automatically, and therefore the means which we employ operates as a unit to both disengage the clutch elements and to manually rock the wiper shaft.

This pin and groove engagement with the spring pressure gives a very positive and definite drive up to the torque required to compress the spring when the pin rides out of the groove, and after this occurs, the pin slides with comparative ease against the side face of the driving member. This is of particular advantage in that, although there is a positive satisfactory and automatic mechanical drive for all requirements, the hand operation of the device is not laborious.

While a coil spring has been shown and described as a proper means whereby instantaneous engagement of the pin 11 and recess 10 may be effected, it will be readily appreciated that any suitable spring means may be employed in this respect.

While we have shown and described a rack and pinion drive, this feature is merely conventional and has nothing to do with our invention, it being only necessary that the member which drives the wiper shaft shall be loose thereon and that said member and shaft be provided with interengaging clutch elements.

What is claimed is:—

1. In a windshield wiper comprising a wiper shaft, a driving member loosely supported thereon, and power driven instrumentalities operatively connected therewith, the herein described means for manually operating said shaft comprising a pin extending from said shaft and normally engaged within a recess in one side face of the driving member, spring means for effecting ready engagement of said pin and recess, and a crank on the end of the shaft whereby the latter may be rocked to simultaneously disengage the shaft from said member and effect manual operations of the wiper shaft.

2. In a windshield wiper, a wiper shaft, power driven instrumentalities, a driving member loosely mounted on said shaft and operatively connected with said instrumentalities, clutching elements carried respectively by said shaft and driving member, spring means normally retaining said clutch elements engaged so that the movements of said member will effect the rocking of the wiper shaft, said spring means permitting the disengagement of said clutch elements by rotation of said shaft independently of said driven instrumentalities, and a crank on the end of the wiper shaft whereby simultaneously said clutching elements may be disengaged and the wiper shaft operated manually.

3. In a windshield wiper, a wiper shaft, a driving member loosely carried thereby, power driven instrumentalities operatively connected with said member, spring pressed clutch elements between said wiper shaft and driving member and disengageable by the rotation of said shaft independently of said power driven instrumentalities, and a crank secured to said shaft and manually operable to simultaneously disengage said clutch elements and rotate said shaft.

4. In a windshield wiper, a wiper shaft, motor driven instrumentalities connected with said wiper shaft for effecting reciprocatory rotary movements of said shaft, said connection including a clutch that is disengageable by the rotation of said shaft independently of said motor driven instrumentalities, and a crank on said shaft that is manually operable to rotate said shaft and simultaneously disengage the clutch.

Signed at Pittsfield, Berkshire County, Massachusetts, this 31st day of October, 1924.

EDWARD T. SHAW.
CHARLES H. PETRONIN.